United States Patent
Smith et al.

(10) Patent No.: US 12,501,844 B2
(45) Date of Patent: Dec. 23, 2025

(54) RESIDUE MANAGER ADJUSTMENT SYSTEM AND METHOD

(71) Applicant: CNH Industrial America LLC, New Holland, PA (US)

(72) Inventors: Kevin M. Smith, Narvon, PA (US); Trevor Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 728 days.

(21) Appl. No.: 17/828,642

(22) Filed: May 31, 2022

(65) Prior Publication Data

US 2023/0380330 A1   Nov. 30, 2023

(51) Int. Cl.
| | |
|---|---|
| A01C 5/06 | (2006.01) |
| A01B 35/16 | (2006.01) |
| A01B 63/00 | (2006.01) |
| A01B 76/00 | (2006.01) |
| G05B 15/02 | (2006.01) |

(52) U.S. Cl.
CPC .............. *A01C 5/062* (2013.01); *A01B 35/16* (2013.01); *A01B 63/008* (2013.01); *A01B 76/00* (2013.01); *G05B 15/02* (2013.01)

(58) Field of Classification Search
CPC ........... A01C 5/06; A01C 5/062; A01B 35/16; A01B 63/008; A01B 63/10; A01B 63/111; A01B 76/00; G05B 15/02
See application file for complete search history.

(56) References Cited

U.S. PATENT DOCUMENTS

| | | | |
|---|---|---|---|
| 7,673,570 B1 | 3/2010 | Bassett | |
| 8,448,717 B2 | 5/2013 | Adams et al. | |
| 8,752,642 B2 | 6/2014 | Whalen et al. | |
| 9,215,837 B2 | 12/2015 | Adams et al. | |
| 10,359,062 B2 | 7/2019 | Stoller et al. | |
| 10,506,755 B2 | 12/2019 | Bassett | |
| 2014/0116735 A1* | 5/2014 | Bassett | A01C 7/203 172/430 |
| 2019/0373797 A1 | 12/2019 | Schoeny et al. | |
| 2019/0373801 A1 | 12/2019 | Schoeny et al. | |
| 2020/0100421 A1 | 4/2020 | Wang | |
| 2020/0281107 A1 | 9/2020 | Stanhope | |

* cited by examiner

Primary Examiner — Tara Mayo
(74) Attorney, Agent, or Firm — Dority & Manning, P.A.

(57) ABSTRACT

A system for a row unit of a planting implement can include a frame. A residue manager assembly can be operably coupled with the frame. The residue manager assembly can include a ground-engaging tool. An actuator can be configured to alter a position of the ground-engaging tool relative to the frame. A sensor assembly can be configured to capture data indicative of a parameter associated with the ground-engaging tool. A computing system can be communicatively coupled to the actuator and the sensor assembly. The computing system can be configured to receive the data indicative of the parameter associated with the ground-engaging tool and activate the actuator to alter the position of the ground-engaging tool relative to the frame based on a deviation of the detected position of the ground-engaging tool from a defined tool position range of the ground-engaging tool.

19 Claims, 5 Drawing Sheets

RESIDUE MANAGER ADJUSTMENT SYSTEM AND METHOD

FIELD

The present disclosure generally relates to planting implements and, more particularly, to a row unit for a planting implement that can include a residue manager adjustment system.

BACKGROUND

Planting implements may be employed to deposit an agricultural product, such as a seed, fertilizer, pesticide, and other chemicals and materials, into soil. In some cases, the planting implements can include one or more furrow-forming tools or openers that excavate a furrow or trench in the soil. One or more dispensing devices of the planting implements may, in turn, deposit the agricultural product into the furrow. After deposition of the agricultural product, a closing assembly may close the furrow in the soil, such as by pushing the excavated soil into the furrow.

In some instances, the implement may include a residue manager that is configured to prepare the ground before seed deposition. In this respect, the residue manager may be configured to break up crop residue on the soil surface. While such systems can work well, an improved residue manager having adjustment features for a planting implement would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for a row unit of a planting implement. The system includes a frame and a residue manager assembly operably coupled with the frame. The residue manager assembly includes a ground-engaging tool, an actuator configured to alter a position of the ground-engaging tool relative to the frame, and a sensor assembly configured to capture data indicative of a parameter associated with the ground-engaging tool. A computing system is communicatively coupled to the actuator and the sensor assembly. The computing system is configured to receive the data indicative of the parameter of the ground-engaging tool and activate the actuator to alter the position of the ground-engaging tool relative to the frame based on a deviation of the detected position of the ground-engaging tool from a defined tool position range of the ground-engaging tool.

In some aspects, the present subject matter is directed to a method for an agricultural operation. The method includes receiving a first defined residue manager tool depth range for a first row unit. The method further includes receiving, from a first sensor assembly, data indicative of a first detected residue manager tool position. In addition, the method includes comparing, with a computing system, the first defined residue manager tool depth range to the first detected residue manager tool position. Lastly, the method includes altering, with a first actuator operably coupled with the computing system, a position of a residue manager tool of the first row unit when the first detected residue manager tool position of the first row unit varies from the first defined residue manager tool depth range.

In some aspects, the present subject matter is directed to a residue manager adjustment system for a planting implement. The system includes a ground-engaging tool positioned below a frame of a row unit. An actuator assembly includes an electrically-controlled actuator and is configured to alter a position of the ground-engaging tool relative to the frame. A sensor assembly is configured to capture data indicative of a parameter associated with ground-engaging tool. A computing system is communicatively coupled to the actuator. The computing system is configured to receive the data indicative of the parameter of the ground-engaging tool and activate the actuator to alter the position of the ground-engaging tool relative to the frame based on a deviation of the detected position of the ground-engaging tool from a defined tool position range of the ground-engaging tool.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a material within a fluid circuit. For example, "upstream" refers to the direction from which a material flows, and "downstream" refers to the direction to which the material moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for a row unit of a planting implement that can include a residue manager assembly. The residue manager assembly can be operably coupled with a frame and/or any other component of the of the row unit. The residue manager assembly can include a ground-engaging tool. The ground-engaging tool can include tillage points or fingers and may be configured to break up crop residue on the soil surface.

The residue manager assembly may further include an actuator assembly that can be configured to alter a position of the ground-engaging tool relative to the frame. In various examples, the actuator assembly may include an actuator, which may be configured as a motor, a cylinder, and/or any other device that may be powered electrically, hydraulicly, pneumatically, magnetically, thermally, and/or through any other manner.

A sensor assembly can be configured to capture data indicative of a parameter associated with the ground-engaging tool. For instance, the sensor assembly may be configured to capture data indicative of a detected position of the ground-engaging tool, a load on the actuator assembly, and/or any other data. A computing system can be communicatively coupled to the actuator assembly and the sensor assembly. The computing system can be configured to receive the data indicative of the parameter of the ground-engaging tool and activate the actuator to alter the position of the ground-engaging tool relative to the frame based on a deviation of the detected position of the ground-engaging tool from a defined tool position range of the ground-engaging tool. Once the ground-engaging tool 64 of the residue manager assembly is returned to the defined tool position and/or the defined tool position range, the actuator may be deactivated. In some systems, the actuator can be controlled row-by-row by the computing system, such as via a dedicated CAN motor control module, which can communicate at high-speed with other modules on each row unit's bus.

Figure 1:
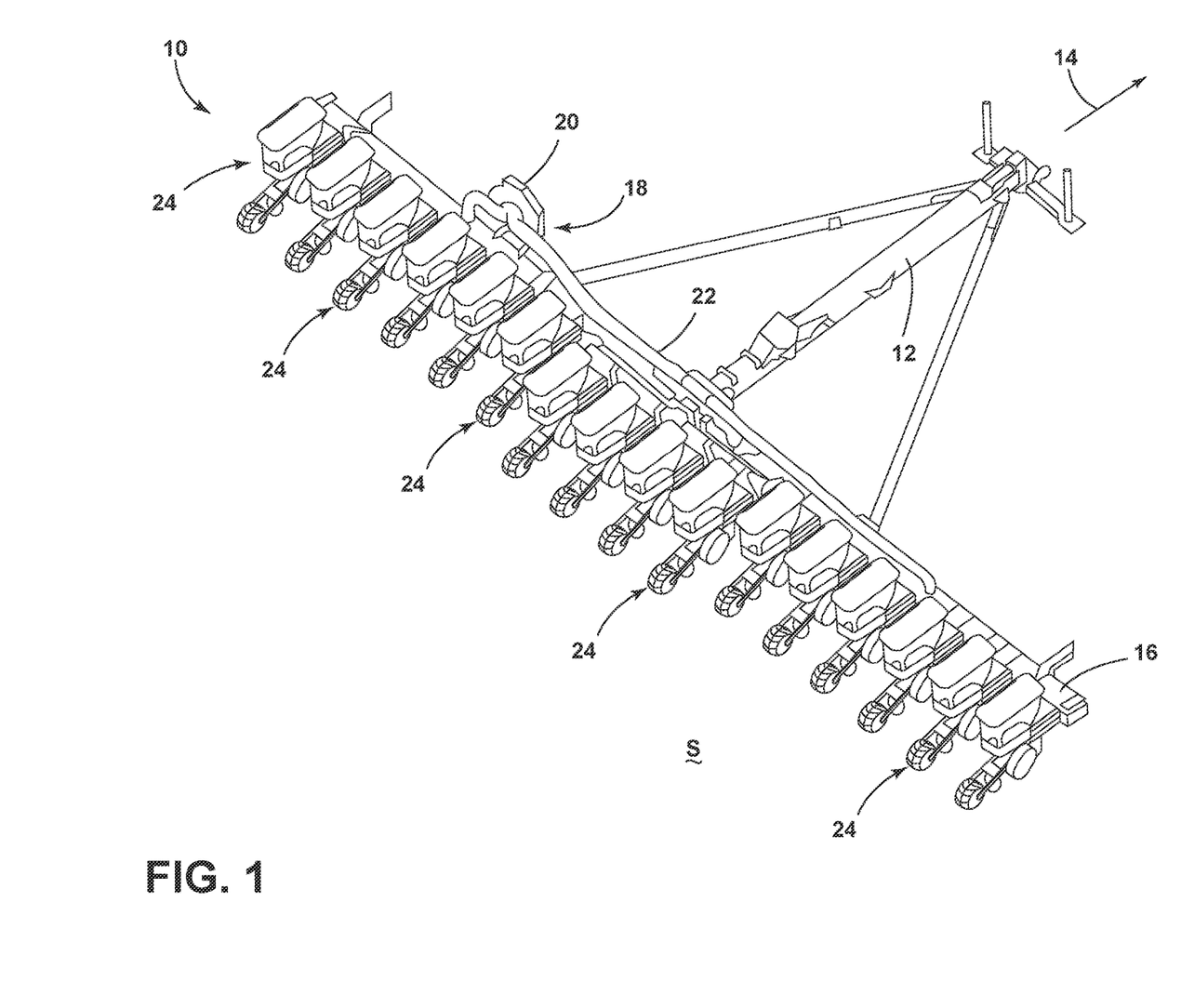
FIG. 1 illustrates a perspective view of a planting implement in accordance with aspects of the present subject matter.

Referring now to the drawings, FIG. 1 illustrates a perspective view of a planting implement 10 in accordance with aspects of the present subject matter. In the illustrated example, the planting implement 10 is configured as a planter. However, in alternative embodiments, the planting implement 10 may generally correspond to any suitable seed-planting equipment or implement, such as seeder or any other seed-dispensing implement.

As shown in FIG. 1, the planting implement 10 can include a tow bar 12. In general, the tow bar 12 may be configured to couple to a tractor or other agricultural vehicle, such as via a suitable hitch assembly. In this respect, the tractor may tow the planting implement 10 across a field in a direction of travel (indicated by arrow 14) to perform a planting operation on the field.

Furthermore, the planting implement 10 can include a toolbar 16 coupled to an aft end portion of the tow bar 12. The toolbar 16 may be configured to support and/or couple to one or more components of the planting implement 10. In some examples, the toolbar 16 may be configured to support a plurality of seed-planting units or row units 24. Each row unit 24 may be configured to form a furrow having a desired depth within the soil S of a field. Thereafter, each row unit 24 may deposit an agricultural product, such as seeds and/or a fertilizer, within the corresponding furrow and subsequently closes the corresponding furrow after the agricultural product has been deposited. In general, the planting implement 10 may include any number of row units 24. For example, in the illustrated example, the planting implement 10 includes sixteen row units 24 coupled to the toolbar 16. However, in other embodiments, the planting implement 10 may include six, eight, twelve, twenty-four, thirty-two, or thirty-six row units 24.

Additionally, in some examples, the planting implement 10 can include a pneumatic distribution system 18. In general, the pneumatic distribution system 18 is configured to distribute seeds from a bulk storage tank to the individual row units 24. As such, the pneumatic distribution system 18 may include a fan 20 or other pressurized air source and a plurality of seed conduits 22 extending between the fan 20 and the row units 24. In this respect, the pressurized air generated by the fan 20 conveys the seeds from the bulk storage tank through the seed conduits 22 to the individual row units 24. However, the seeds may be provided to the row units 24 in any other suitable manner.

It will be further appreciated that the configuration of the planting implement 10 described above and shown in FIG. 1 is provided only to place the present subject matter in an exemplary field of use. Thus, it will be appreciated that the present subject matter may be readily adaptable to any agricultural implement configuration.

Figure 2:
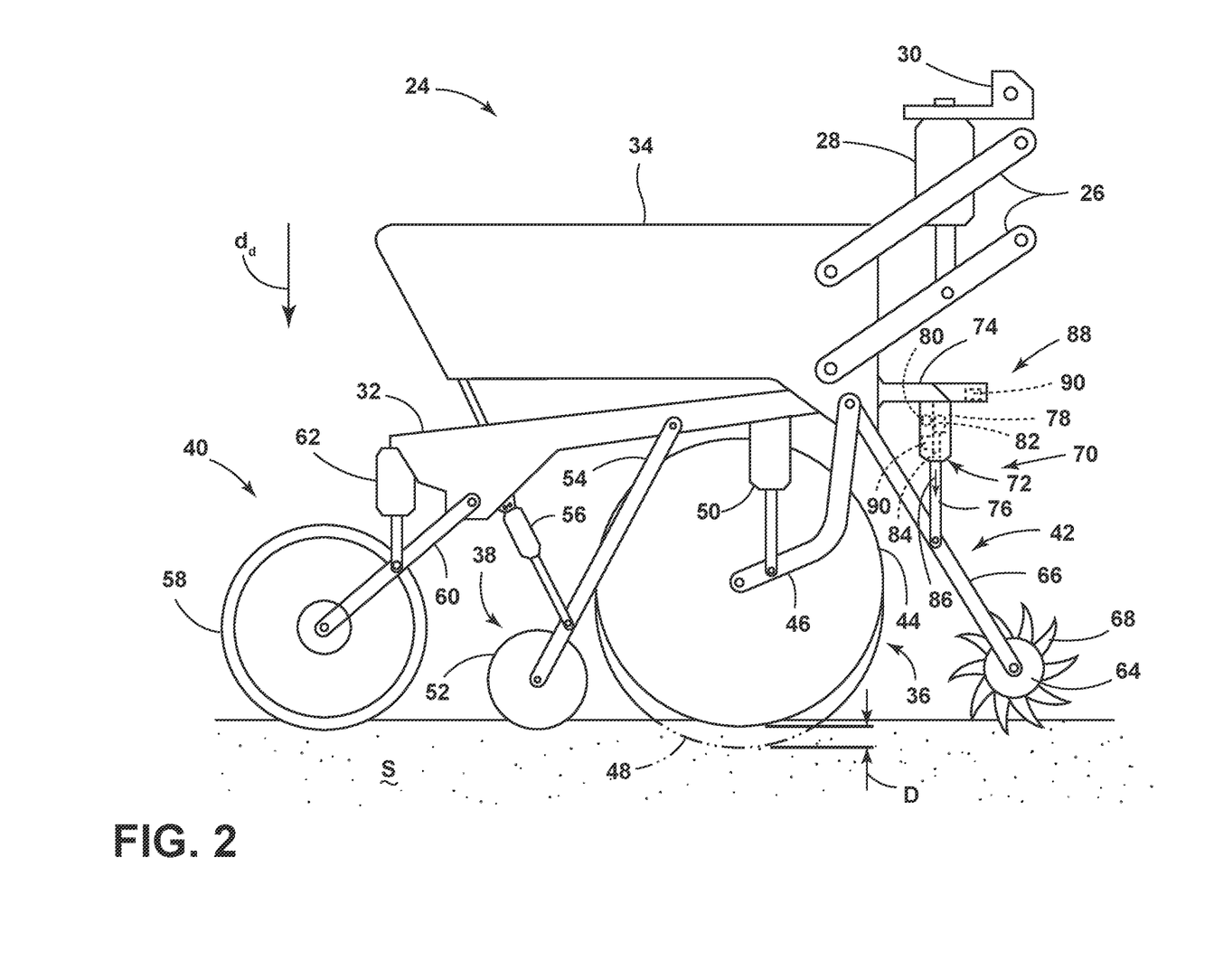
FIG. 2 illustrates a perspective view of a row unit for a planting implement in accordance with aspects of the present subject matter.

Referring now to FIG. 2, the row unit 24 can include a linkage assembly 26, which may be a four-bar linkage, which can be configured to couple the row unit 24 to the toolbar 16, while enabling vertical movement of the row unit 24. In addition, a down force cylinder 28 can extend between a mounting bracket 30 and a lower portion of the parallel linkage to establish a contact force between the row unit 24 and the soil S. The down force cylinder 28 is configured to apply a force to the row unit 24 in a downward direction $d_d$, thereby driving a ground-engaging tool 64 into the soil S. As will be appreciated, a desired level of down force may vary based on soil type, the degree of tillage applied to the soil S, soil moisture content, amount of residue cover, and/or tool wear, among other factors. Because such factors may vary from one side of the implement 10 to the other, a different level of down force may be selected for each row unit 24.

Furthermore, a desired level of down force may be at least partially dependent on the speed at which the row unit 24 is pulled across the field. For example, as speed increases, the ground-engaging tools 64 may have a tendency to rise out of the ground due to the interaction between the soil S and the implement 10. Consequently, a greater down force may be applied during higher speed operation to ensure that the ground-engaging tools 64 remain at a desired depth. In addition, the weight of the row unit 24 applies a force to the ground-engaging tools 64 in the downward direction $d_d$. However, as seeds and/or other products are transferred from a storage container within the row unit 24 to the soil S, the weight of the row unit 24 decreases. Therefore, the down force cylinder 28 may apply a greater force to the row unit 24 to compensate. In some examples, the down force cylinder 28 may be coupled to a control system (e.g., a computing system 102 (FIG. 3) and/or a controller 104 (FIG. 3)) configured to automatically regulate the pressure within the down force cylinder 28 to maintain a desired contact force between the ground-engaging tools 64 and the soil S. Because each row unit 24 can include an independent down force cylinder 28, the contact force may vary across the implement 10, thereby establishing a substantially uniform seed deposition depth throughout the field.

In the various examples, the linkage assembly 26 can be pivotally coupled to a chassis 32 and a frame 34. The frame 34 may be configured to support various elements of the row unit 24, such as a metering system and a product storage container, for example. As illustrated, the chassis 32 can support an opener assembly 36, a soil closing assembly 38, a press assembly 40, and a residue manager assembly 42. In the illustrated configuration, the opener assembly 36 can include a gauge wheel assembly having a gauge wheel 44 and a rotatable arm 46 which can function to movably couple the gauge wheel 44 to the chassis 32. The gauge wheel 44 may be positioned a vertical distance D above an opener disk 48 to establish a desired trench depth for seed deposition into the soil S. As the row unit 24 travels across a field, the opener disk 48 excavates a trench into the soil S, and seeds are deposited into the trench. The opener assembly 36 can also include a depth control cylinder 62 extending between the chassis 32 and the rotatable arm 46 of the gauge wheel assembly. The depth control cylinder 62 is configured to adjust the penetration depth D of the opener disk 48 by varying a position of the gauge wheel 44 relative to the chassis 32. While one opener assembly 36 is illustrated in the present examples, it will be appreciated that alternative examples may include a pair of opener assemblies 36 positioned on opposite sides of the chassis 32. In such configurations, the opener disks 48 may be angled toward one another to establish a wider trench within the soil S.

As will be appreciated, seeds may be deposited within the excavated trench via a seed tube extending between a metering system within the frame 34 and the soil S. The seed tube exit may be positioned aft of the opener assembly 36 and forward of the closing assembly 38 such that seeds flow into the trench. Closing disks 52 of the closing assembly 38 can push the excavated soil into the trench, thereby closing the trench. As illustrated, the closing assembly 38 can include an arm 60 extending between the chassis 32 and the closing disk 52. A closing disk cylinder 62 can be operably coupled to the arm 60 of the closing assembly 38 and configured to regulate a contact force between the closing disk 52 and the soil S. For example, a large contact force may be applied to effectively push dense soil into the trench, while a relatively small contact force may be applied to close a trench within loose soil. While one closing disk 52 is shown in the illustrated example, a pair of disks 52 may be provided without departing from the teachings provided herein. Additionally or alternatively, various examples may employ closing wheels instead of the illustrated closing disk 52.

As illustrated, a press wheel 58 of the press wheel assembly 40 can be positioned aft of the closing assembly 38 and can serve to pack soil on top of the deposited seeds. In some examples, the press wheel assembly 40 can include an arm 60 extending between the chassis 32 and the press wheel 58. A press wheel cylinder 62 can be operably coupled to the arm 60 of the press wheel assembly 40 and configured to regulate a contact force between the press wheel 58 and the soil S. For example, in dry conditions, it may be desirable to firmly pack soil directly over the seeds to seal in moisture. In damp conditions, it may be desirable to leave the soil S over the seeds fairly loose in order to avoid compaction which may result in seed crusting. The process of excavating a trench into the soil S, depositing seeds within the trench, closing the trench, and packing soil on top of the seeds establishes a row of planted seeds within a field. By employing multiple row units 24 distributed along the toolbar 16, as shown in FIG. 1, multiple rows of seeds may be planted within the field.

In some examples, the row unit 24 can employ a residue manager assembly 42 to prepare the ground before seed deposition. As illustrated, the residue manager assembly 42 can include a ground-engaging tool 64, such as a wheel, coupled to the chassis 32 by a linkage 66. The ground-engaging tool 64 can include tillage points or fingers 68 configured to break up crop residue on the soil surface. While a single residue manager ground-engaging tool 64 is shown in the illustrated example, it will be appreciated that the residue manager assembly 42 may include a pair of ground-engaging tools 64 angled toward one another. In addition, the residue manager assembly 42 may serve as a shock absorber to dissipate row unit bounce caused by contact with rocks or piles of residue, thereby protecting mechanical components of the row unit 24.

A residue manager depth adjustment system 70 can be configured to regulate a contact force between the ground-engaging tool 64 and the soil S. In some instances, the residue manager adjustment system 70 may include an actuator assembly 72 that can extend from a bracket 74 to the linkage 66 of the residue manager assembly 42. The bracket 74 may be operably coupled with any component of the row unit 24, such as the frame 34 or the chassis 32, and/or any component of the implement 10, such as the toolbar 16. In various examples, the actuator assembly 72 can be configured to move an adjustment rod 76 that may be operably coupled with the linkage 66 of the residue manager assembly 42 to regulate the contact force between the ground-engaging tool 64 of the residue manager assembly 42 and the soil S.

In several embodiments, the actuator assembly 72 can include a housing 78 that may be coupled to the bracket 74, and/or any other component of the row unit 24. The housing 78 may, in turn, be configured to enclose and/or otherwise support one or more components of the actuator assembly 72. For instance, as shown in FIG. 2, the actuator assembly 72 can include an actuator 80 positioned within the housing 78. In various examples, the actuator 80 may be configured to generate motion to move the adjustment rod 76. In various instances, the actuator 80 may be configured as a motor, a cylinder, and/or any other device that may be powered electrically, hydraulicly, pneumatically, magnetically, thermally, and/or through any other manner.

Additionally or alternatively, the actuator assembly 72 can include a gearbox 82 or transmission coupled to the actuator 80. In some instances, the actuator assembly 72 can further include a threaded shaft 84 that can be coupled to the gearbox 82. In this respect, the gearbox 82 can convert rotation generated by the actuator 80 into rotation of the threaded shaft 84 (e.g., which may occur at a different speed and/or with a different torque amount). Such rotation of the threaded shaft 84, in turn, causes the adjustment rod 76 to linearly move (e.g., as indicated by arrow 86) in a manner to regulate a contact force between the ground-engaging tool 64 and the soil S.

In some instances, the actuator assembly 72 can further include a sensor assembly 88 positioned within the housing 78 and/or externally form the housing 78. The sensor assembly 88 can include one or more sensors 90 configured to provide data indicative of a parameter associated with the ground-engaging tool 64. For instance, the sensor assembly 88 may be configured to capture data indicative of a detected position of the ground-engaging tool (or any other component of the residue manager assembly 42) relative to the frame 34, the soil S, and/or any other component, a load on the actuator assembly, and/or any other data. a position of the ground-engaging tool 64. In several examples, the one or more sensors 90 may be operably coupled to the bracket 74, frame 34, chassis 32, toolbar 16, or any other component of the implement 10. In addition, the one or more sensors 90 may be configured as a proximity sensor, such as a LIDAR sensor, a RADAR sensor, an image sensor (an area-type image sensor, such as a CCD or a CMOS image sensor, and image-capturing optics that capture an image of an imaging field of view), and/or any other type of practicable sensor. Additionally or alternatively, the one or more sensors 90 may be positioned within and/or otherwise operably coupled with the housing 78 of the actuator assembly 72. For example, the sensor 90 may be configured as one or more capacitive displacement sensors, Eddy-current sensors, Hall effect sensors, inductive sensors, potentiometers (e.g., string potentiometers), laser Doppler vibrometers, linear variable differential transformers (LVDT), photodiode arrays, piezoelectric transducers, position encoders, proximity sensors, ultrasonic sensors, or any other practicable device.

In some instances, the sensor within the actuator assembly 72 may be configured to detect a position, a speed, and/or an acceleration of the actuator 80, Based on the position, the speed, and/or the acceleration of the actuator 80, a position, a speed, and/or an acceleration of the adjustment rod 76, and/or any other component, may also be determined. Additionally or alternatively, the sensor within the actuator assembly 72 may be configured to detect a load on the actuator 80, the adjustment rod 76, and/or any other component. In operation, the sensor may detect a change in position and/or a load on the actuator 80, which may be used to determine a change in position of the ground-engaging tool 64 of the residue manager assembly 42. Once a change in the position of the ground-engaging tool 64 of the residue manager assembly 42 deviates from a defined tool position and/or a defined tool position range, the actuator 80 may be activated to return the ground-engaging tool 64 of the residue manager assembly 42 to the defined tool position and/or the defined tool position range. Once the ground-engaging tool 64 of the residue manager assembly 42 is returned to the defined tool position and/or the defined tool position range, the actuator 80 may be deactivated.

Figure 3:
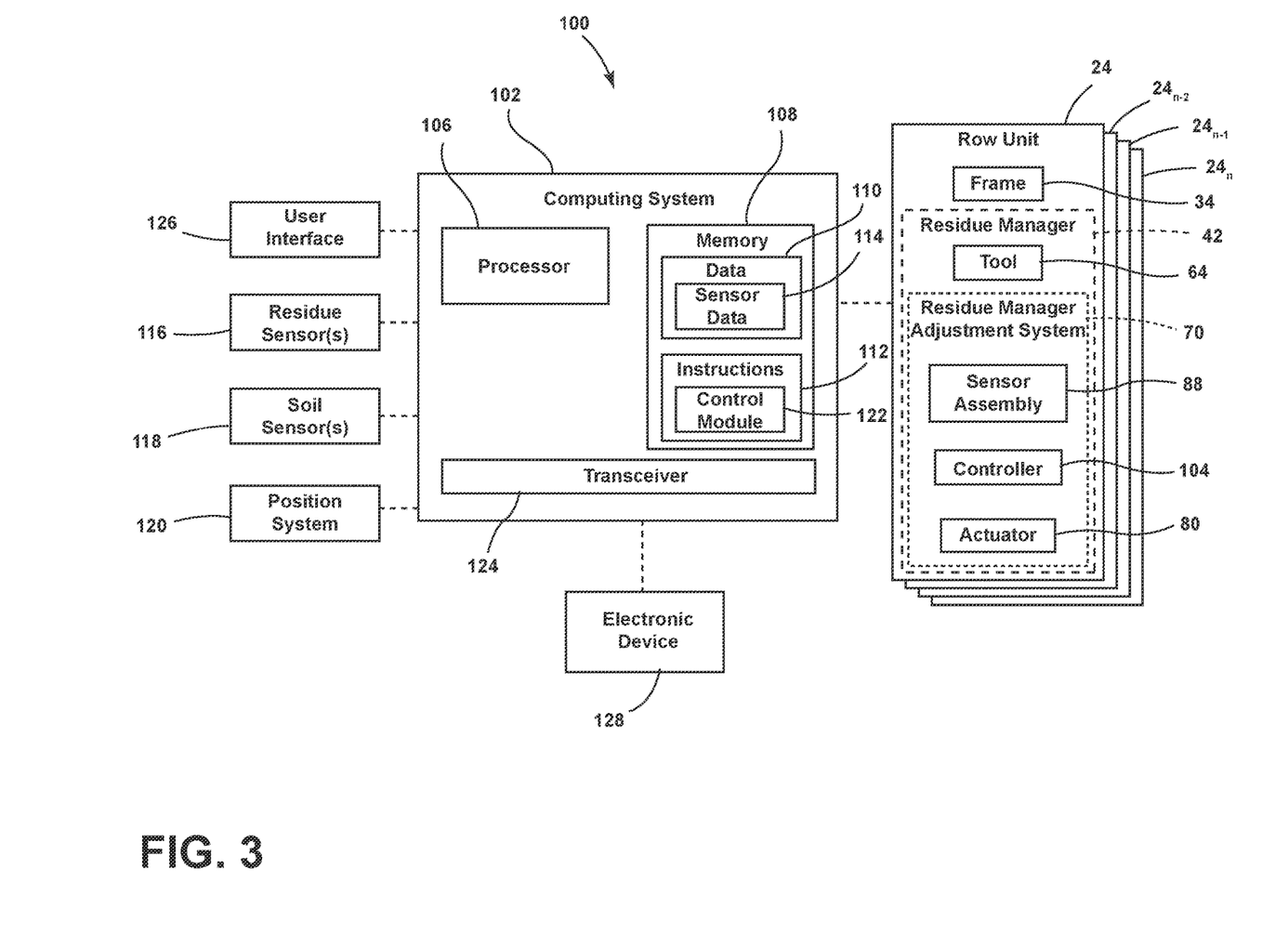
FIG. 3 illustrates a block diagram of components of a system for selectively adjusting one or more row units of a planting implement in accordance with aspects of the present subject matter.

Referring now to FIG. 3, a block view of a system 100 for operating various agricultural implements is illustrated in accordance with aspects of the present subject matter. In general, the system 100 will be described herein with reference to the planting implement 10 and the row unit 24 described above with reference to FIGS. 1 and 2. However, it will be appreciated that the disclosed system 100 may generally be utilized with any planter or seeder having any suitable implement configuration, with row units 24 having any suitable row unit configuration, with seed meters having any suitable meter configuration, and/or with seed transport members have any suitable transport member configuration. For purposes of illustration, communicative links, or electrical couplings of the system 100 shown in FIG. 3 are indicated by dashed lines. The one or more communicative links or interfaces may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). In various examples, the wireless communication networks can include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

In several examples, the system 100 may include a computing system 102 and various other components configured to be communicatively coupled to and/or controlled by the computing system 102, such as one or more row units 24 and a respective residue manager depth adjustment system 70 operably coupled with each row unit 24. Accordingly, while one row unit 24 and residue manager depth adjustment system 70 is illustrated in FIG. 3, it will be appreciated that the planting implement 10 may include any number of row units 24, $24_{n-2}$, $24_{n-1}$, $24_n$ without departing from the scope of the present disclosure.

The computing system 102 may be communicatively coupled to a respective actuator 80 of the one or more row units 24, $24_{n-2}$, $24_{n-1}$, $24_n$. The computing system 102 can be configured to receive data indicative of a parameter of a ground-engaging tool 64 (or another component) of the residue manager assembly 42 and activate the actuator 80 (possibly through a respective controller 104 associated with each residue manager depth adjustment system 70) to alter the position of the ground-engaging tool 64 (or another component) of the residue manager assembly 42 relative to the soil S (FIG. 2) and/or to the frame 34 of the row unit 24 based on a deviation of the detected position from a defined tool position and/or a defined tool position range. By analyzing the sensor data, the residue manager depth adjustment system 70 may be capable of maintaining the ground-engaging tool 64 of the residue manager assembly 42 within a defined tool position and/or a defined tool position range.

In some examples, the actuator 80 may be electronically controlled and configured as a brushless DC (BLDC) electric motor. In such examples, the amount of power supplied to the motor, the frequency/duty cycle of pulses of the motor, and/or rotational speed of the motor is used to regulate the torque and, therefore, a ground pressure on the residue manager linkage. In some systems, the motor can be controlled row-by-row by the computing system 102, such as via a dedicated CAN motor control module, which can communicate at high-speed with other modules on each row unit's bus and/or with each unit's controller 104.

In general, the computing system 102 may comprise any suitable processor-based device, such as a computing device or any suitable combination of computing devices. Thus, in several embodiments, the computing system 102 may include one or more processors 106 and associated memory 108 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 108 of the computing system 102 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 108 may generally be configured to store information accessible to the processor 106, including data 110 that can be retrieved, manipulated, created, and/or stored by the processor 106 and instructions 112 that can be executed by the processor 106 and configure the computing system 102 to perform various computer-implemented functions, such as one or more algorithms and/or related methods. In addition, the computing system 102 may also include various other suitable components, such as a communications circuit or module, one or more input/output channels, a data/control bus, and/or the like.

In several embodiments, the data 110 may be stored in one or more databases. For example, the memory 108 may include a sensor database 114 for storing sensor data from the one or more sensors 90. For example, the data 110 may be associated with the operation of the residue manager adjustment system 70, which may be received the sensor assembly 88 associated with the residue manager adjustment system 70.

The sensor data 110 may additionally or alternatively be associated with a residue sensor 116. In several instances, the residue sensor 116 may be configured to capture data indicative of an amount and/or type of residue within the field. For instance, the residue sensor 116 may be configured as imaging devices, cameras, ultrasonic transceivers, RADAR sensors, LIDAR sensors, and/or any other practicable device that may be provided in operative association with the implement 10 to capture images of or data associated with a portion of the field, which in turn, may be analyzed to determine a residue coverage and/or residue type within one or more portions of the field.

The sensor data 110 may additionally or alternatively be associated with a soil sensor 118. In various instances, the soil sensor 118 may be configured to capture data indicative of the soil composition within the field. It will be appreciated that the soil sensor 118 may generally correspond to any suitable sensing device configured to function as described herein. For example, in various embodiments, the soil sensor 118 may include an emitter configured to emit an electromagnetic radiation signal, such as an ultraviolet radiation signal, a near-infrared radiation signal, a mid-infrared radiation signal, or a visible light signal for reflection off of the soil S (FIG. 2). The soil sensor 118 may also include a receiver configured to receive the reflected electromagnetic radiation signal. One or more spectral parameters (e.g., the amplitude, frequency, and/or the like) of the reflected electromagnetic radiation signal may, in turn, be indicative of the soil composition. In this regard, the emitter may be configured as a light-emitting diode (LEDs), or another electromagnetic radiation-emitting device and the receiver may be configured as a photoresistor or other electromagnetic radiation-receiving device. However, in alternative embodiments, the soil sensor 118 may have any other suitable configuration and/or components.

The sensor data 110 may additionally or alternatively be associated with a position system 120. For example, in some examples, the position system 120 may be configured to determine the location of the implement 10 and/or the row unit 24 by using a satellite navigation position system (e.g. a global positioning system (GPS), a Galileo positioning system, the Global Navigation satellite system (GLONASS), the BeiDou Satellite Navigation and Position system, a dead reckoning device, and/or any other practicable device). In such embodiments, the location determined by the position system 120 may be transmitted to the computing system 102 (e.g., in the form of location coordinates) and stored within as the sensor data 110 for subsequent processing and/or analysis.

During operation of the system 100, data from all or a portion of the sensors communicatively coupled to the computing system 102 may be stored (e.g., temporarily) within the sensor database 114 and subsequently used to determine one or more operating parameters associated with the operation of the residue manager adjustment system 70 and/or the planting implement 10. Additionally, in several embodiments, the instructions 112 stored within the memory 108 of the computing system 102 may be executed by the processor(s) 106 to implement a control module 122. In general, the control module 122 may be configured to sample and/or evaluate the data received from the various sensors communicatively coupled to the computing system 102 and/or other inputs received by the computing system 102. In various examples, the control module 122 may be configured to sample and/or evaluate the data from one or more of the sensors described herein continuously, periodically, or only as demanded. Based on the data, the control module 122 may provide instructions 112 to alter or manipulate the residue manager adjustment system 70. Additional data may be provided to the computing system 102 (or the controller 104 of the residue manager adjustment system 70) after the alteration or manipulation of the residue manager adjustment system 70, which can lead to subsequent alterations or manipulations to maintain a detected position of a ground-engaging tool 64 (or another component) of the residue manager assembly 42 within a defined tool position and/or within a defined tool position range. In some systems, the actuator 80 of the residue manager adjustment system 70 can be controlled row-by-row by the computing system 102, such as via a dedicated CAN motor control module, which can communicate at high-speed with other modules on each row unit's bus and/or with each row unit's controller 104.

Moreover, as shown in FIG. 3, the computing system 102 may also include a transceiver 124 to communicate via wired and/or wireless communication with any of the various other system components described herein. For instance, the system 100 may also include a user interface 126 that may be in communication with the computing system 102. In some cases, the user interface 126 may be configured to provide feedback (e.g., notifications associated with the operational parameters of each row unit 24) to the operator of the planting implement 10. As such, the user interface 126 may include one or more feedback devices, such as display screens, speakers, warning lights, and/or any other practicable device, which are configured to communicate such feedback. In addition, some examples of the user interface 126 may include one or more input devices, such as touchscreens, keypads, touchpads, knobs, buttons, sliders, switches, mice, microphones, and/or any other practicable device, which are configured to receive user inputs from the operator, which may be a defined tool position and/or a defined tool position range for a ground-engaging tool 64 (or another component) of the residue manager assembly 42. In various examples, the user interface 126 may be positioned within a cab of a work vehicle configured to tow the planting implement 10 across the field. However, in alternative embodiments, the user interface 126 may have any suitable configuration and/or be positioned in any other suitable location.

Further, the computing system 102 may also communicate via wired and/or wireless communication with one or more remote electronic devices 128 through the transceiver 124. The electronic device 128 may include a display for displaying information to a user. For instance, the electronic device 128 may display one or more user interfaces and may be capable of receiving remote user inputs to set a predefined threshold for any of the operating parameters and/or to input any other information. In addition, the electronic device 128 may provide feedback information, such as visual, audible, and tactile alerts, and/or allow the user to provide one or more inputs through the usage of the remote electronic device 128, which may be a defined tool position and/or a defined tool position range for a ground-engaging tool 64 (or another component) of the residue manager assembly 42. It will be appreciated that the electronic device 128 may be any one of a variety of computing devices and may include a processor and memory. For example, the electronic device 128 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Additionally or alternatively, a defined tool position and/or a defined tool position range for a ground-engaging tool 64 (or another component) of the residue manager assembly 42 may be found or selected in any other suitable way, such as from a predetermined look-up table stored in the computing system 102 and/or one or more controllers 104. In some instances, the look-up tables may be based on the agricultural product being deposited within the field and/or an application map that is stored within the computing system 102.

It will be appreciated that, in general, the computing system 102 of the disclosed system 100 may correspond to any suitable computing device(s) that can be configured to function as described herein. In several embodiments, the computing system 102 may form part of an active planting system configured to perform a planting operation, such as by corresponding to a vehicle controller of a work vehicle configured to tow an associated planting implement 10 and/or an associated implement controller of the planting implement 10. Alternatively, the computing system 102 may comprise a separate computing device(s) configured to be used primarily for the purpose of performing the various calibration methods and/or routines described herein.

It will additionally be appreciated that the computing system 102 may correspond to an existing controller of the planting implement 10 or an associated work vehicle or the computing system 102 may correspond to a separate processing device. For instance, in some cases, the computing system 102 may form all or part of a separate plug-in module that may be installed within the planting implement 10 or associated work vehicle to allow for the disclosed system and method to be implemented without requiring additional software to be uploaded onto existing control devices of the planting implement 10 or the associated work vehicle.

Figure 4:
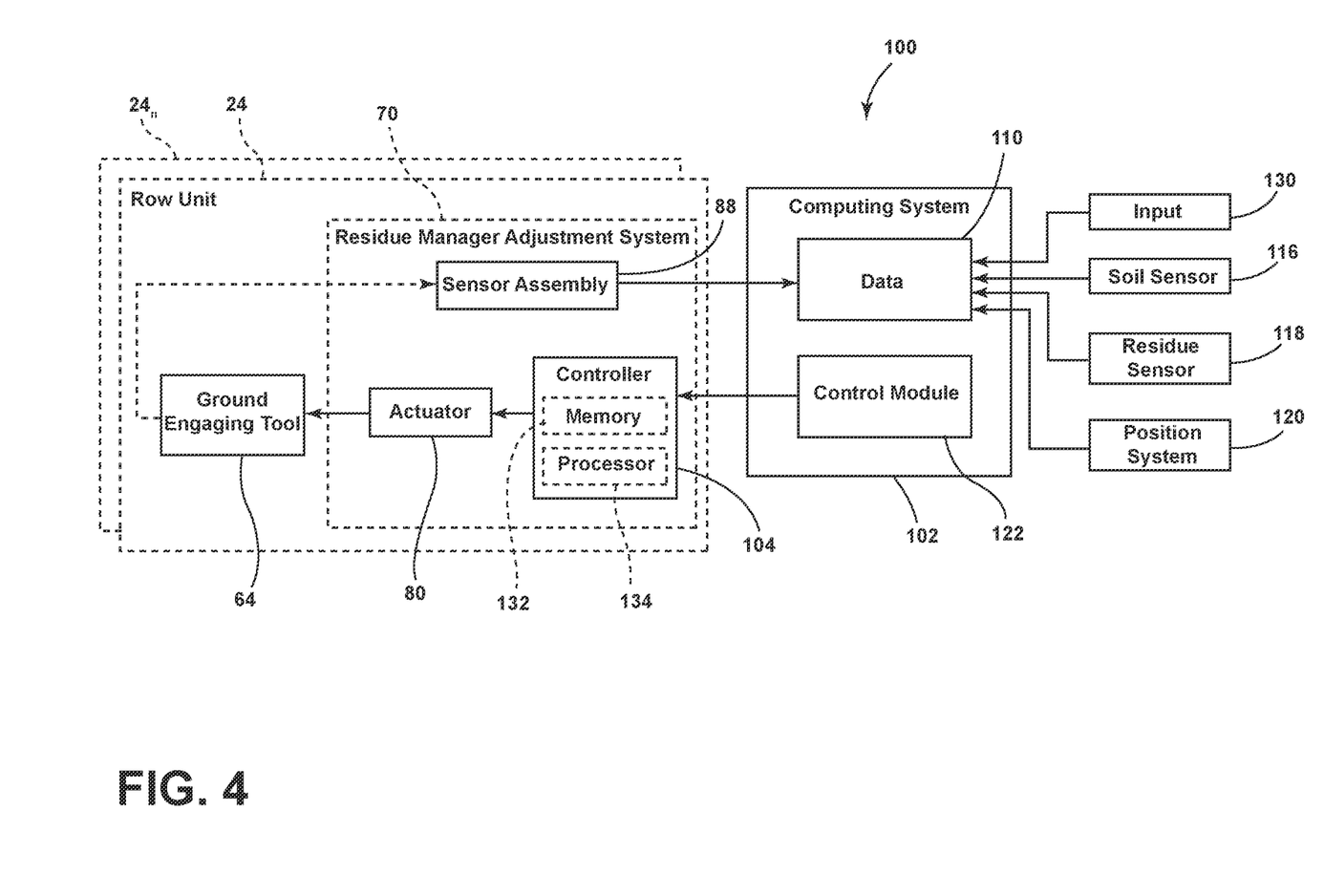
FIG. 4 is a schematic block diagram illustrating portions of the system of FIG. 3 in accordance with aspects of the present subject matter.

Referring now to FIG. 4, various components of the system 100 are illustrated in accordance with various aspects of the present disclosure. As shown, the computing system 102 may receive data from various components of the system 100 and, in turn, alter or manipulate the residue manager adjustment system 70 by activating and deactivating a respective actuator 80 within each row unit 24. Additional data may be provided after the alteration or manipulation of the residue manager adjustment system 70, which can lead to subsequent alterations or manipulations to maintain a detected position of the ground-engaging tool 64 within a defined tool position and/or a defined tool position range for each row unit 24.

As illustrated, the computing system 102 may receive an input 130 related to a defined tool position and/or a defined tool position range of the position of a ground-engaging tool 64 (or another component) of the residue manager assembly 42. As provided herein, in some instances, when a detected position of the ground-engaging tool 64 deviates from the defined tool position and/or the defined tool position range, the computing system 102 may activate the actuator 80 (possibly through a respective controller 104 associated with each residue manager depth adjustment system 70). Once the detected position of the ground-engaging tool 64 returns to the defined tool position and/or the defined tool position range, the computing system 102 may deactivate the actuator 80 (possibly through a respective controller 104 associated with each residue manager depth adjustment system 70).

In various instances, the input 130 may be received from a component of the tractor or the planting implement 10, such as a user interface 126. Additionally or alternatively, the input 130 may be received from a device that is remote from the tractor or the planting implement 10. Additionally or alternatively, the input 130 may be provided in any other suitable way, such as from a predetermined look-up table stored in the computing system 102 and/or one or more controllers 104. In some instances, the input 130 may vary the position of a ground-engaging tool 64 of a first row unit 24 from a position of a ground-engaging tool 64 of a second row unit $24_n$ for various purposes, such as the product being deposited based on a variable prescription map, various products being deposited within the soil S (FIG. 2), the planting implement 10 traversing uneven ground, variations in the soil S (FIG. 2), and/or for any other purpose.

Based on the input 130, the control module 122 may determine a detected position of the ground-engaging tool 64 from the defined tool position and/or the defined tool position range of the ground-engaging tool 64. In turn, the control module 122 may provide instructions 112 to a controller 104 of each row unit 24. In some cases, the controller 104 may be operably coupled with the actuator 80 and the computing system 102. As such, the computing system 102 can activate the actuator 80 by providing instructions 112 to the controller 104 and, in turn, the controller 104 manipulates the actuator 80 based on the instructions 112 provided by the computing system 102. Additionally or alternatively, the computing system 102 may provide instructions 112 to the actuator 80 without any intermediary controller 104.

In various examples, the instructions 112 may be based on a variation of a detected position of the ground-engaging tool 64 from the defined tool position and/or the defined tool position range of the ground-engaging tool 64 and other considerations, such as a soil composition along the planting implement 10, which may be provided by the soil sensor 118, an amount and/or type of residue within the field, which may be provided by the reside sensor, and/or a location of the implement 10, which may be provided by the position system 120. Based on the instructions 112, the actuator 80 of each row unit 24 may be activated if a change in position of the ground-engaging tool 64 of one or more row units 24 is needed to maintain the defined tool position and/or the defined tool position range of the ground-engaging tool 64.

In addition, a sensor assembly 88 associated with each respective row unit 24 may capture data related to a position of the ground-engaging tool 64 relative to the frame 34, the soil S (FIG. 2), and/or any other component. The data provided by the sensor assembly 88 may be provided to the computing system 102, which may provide additional instructions 112 to the row unit 24 should a subsequent manipulation or alteration be needed to return the ground-engaging tool 64 of one or more row units 24 to the defined tool position and/or within the defined tool position range of the ground-engaging tool 64.

In some instances, the data provided from the sensor assembly 88 may additionally or alternatively be provided to the controller 104 of each row unit 24 such that subsequent modifications of the actuator 80 may be performed without additional instructions 112 from the computing system 102 that may be remote from the row unit 24. It will be appreciated that the controller 104 may be any one of a variety of computing devices and may include a processor 132 and memory 134.

With further reference to FIG. 4, while one row unit 24 is schematically illustrated, each row unit 24 may include a respective residue manager adjustment system 70. As such, the computing system 102 may be operably coupled with a first row unit 24 and a second row unit $24_n$ that are laterally offset from one another. In some instances, the computing system 102 may be configured to activate the first actuator 80 to alter a position of a first ground-engaging tool 64 relative to the first frame 34 and activate the second actuator 80 to alter a position of a second ground-engaging tool 64 relative to the second frame 34. The activation of the first actuator 80 may be independent of the activation of the second actuator 80. In addition, in some instances, a first sensor assembly 88 may be positioned within the first row unit 24 and a second sensor assembly 88 may be positioned within the second row unit $24_n$. The computing system 102 may be configured to receive data indicative of the parameter of the first ground-engaging tool 64 from the first sensor assembly 88 and data indicative of the parameter of the second ground-engaging tool 64 from the second sensor assembly 88. In turn, a vertical position of the first ground-engaging tool 64 relative to the frame 34 of the first row unit 24 is varied from a vertical position of the second ground-engaging tool 64 relative to the second row unit $24_n$.

As such, the system 100 may allow for closed-loop control of one or more row units 24, $24_n$ by the control module 122 to allow for the inputted defined tool position and/or within the defined tool position range of the ground-engaging tool 64 of each row unit 24, $24_n$ to be accomplished for each row unit 24, $24_n$. Additionally or alternatively, the system 100 may allow for closed-loop control of each row unit 24, $24_n$ by the controller 104 of each row unit 24, $24_n$ for the inputted defined tool position and/or within the defined tool position range of the ground-engaging tool 64 of each row unit 24, $24_n$ to be accomplished for each row unit 24, $24_n$.

In various examples, the system 100 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system 102 and/or each controller 104 and may be used to generate a predictive evaluation of the alterations to the actuator 80. For instance, the control module 122 may alter the actuator 80. In turn, the sensor assembly 88 may monitor the corresponding ground-engaging tool position changes and/or residue changes. Each change may be fed back into the control module 122 and/or the controller 104 for each row unit 24, $24_n$ for further alterations to the actuator 80.

Figure 5:
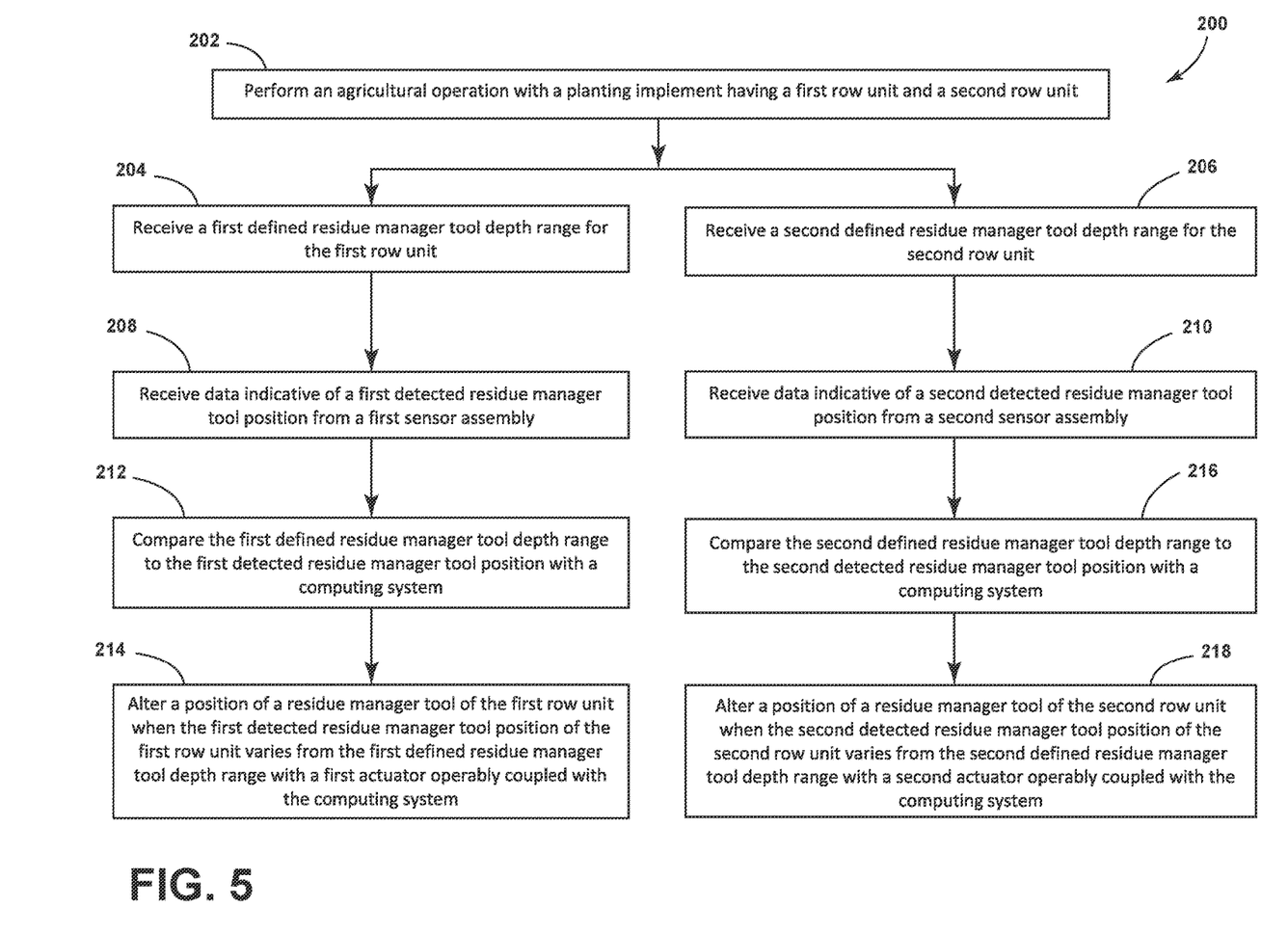
FIG. 5 illustrates a flow diagram of a method for an agricultural operation in accordance with aspects of the present subject matter.

Referring now to FIG. 5, a flow diagram of some examples of a method 200 for an agricultural operation is illustrated in accordance with aspects of the present subject matter. In general, the method 200 will be described herein with reference to the planting implement 10 and one or more row units 24 described above with reference to FIGS. 1-4. However, the disclosed method 200 may generally be utilized with any suitable vehicle and/or implement. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated in FIG. 5, at (202), the method 200 can include performing an agricultural operation with a planting implement having a first row unit and a second row unit. Each row unit may be configured to form a furrow having a desired depth within the soil of a field. Thereafter, each row unit may deposit an agricultural product, such as seeds and/or a fertilizer, within the corresponding furrow and subsequently closes the corresponding furrow after the agricultural product has been deposited. In addition, each row unit can employ a residue manager assembly to prepare the ground before seed deposition. As illustrated, the residue manager assembly can include a ground-engaging tool coupled to the chassis of the row unit by an adjustment rod. In general, the planting implement may include any number of row units. As such, while the described method can include a first row unit and a second row unit, the planting implement may include any number of row units without departing from the teachings provided herein.

At (204), the method 200 can include receiving a first defined residue manager tool depth range for the first row unit. Similarly, at (206), the method 200 can include receiving a second defined residue manager tool depth range for the second row unit. In various examples, the first defined residue manager tool depth range and the second defined residue manager tool depth range may be equal or varied from one another. In instances in which the first defined residue manager tool depth range and the second defined residue manager tool depth range are common with one another, a single input may be used to input each of the first defined depth range and the second defined depth range.

In addition, in some examples, the first defined residue manager tool depth range and/or the second defined residue manager tool depth range may be received from a user interface operably coupled with the computing system. Additionally or alternatively, in various examples, the first defined residue manager tool depth range and/or the second defined residue manager tool depth range may be received from an electronic device operably coupled with the computing system. Additionally or alternatively, in several examples, the first defined residue manager tool depth range and/or the second defined residue manager tool depth range are determined based on one or more look-up tables.

At (208), the method 200 can include receiving data indicative of a parameter (e.g., a first detected residue manager tool position) from a first sensor assembly. Likewise, at (210), the method 200 can include receiving data indicative of a second parameter (e.g., a detected residue manager tool position) from a second sensor assembly.

At (212), the method 200 can include comparing the first defined residue manager tool depth range to the first detected residue manager tool position with a computing system. At (214), the method 200 can include altering a position of a residue manager tool of the first row unit when the first detected residue manager tool position of the first row unit varies from the first defined residue manager tool depth range with a first actuator operably coupled with the computing system. In some cases, altering the position of the ground-engaging tool of the first row unit when the first detected residue manager tool position of the first row unit varies from the first defined residue manager tool depth range can further include providing instructions from the computing system to a controller associated with the first row unit. In turn, the first controller can be configured to manipulate the first actuator.

In some instances, altering a position of a residue manager tool of the first row unit when the first detected residue manager tool position of the first row unit varies from the first defined residue manager tool depth range with a first actuator operably coupled with the computing system can further include activating the first actuator when the first detected residue manager tool position of the first row unit varies from the first defined residue manager tool depth range. When the first detected residue manager tool position returns to the first defined residue manager tool depth range, the first actuator may return to a deactivated state.

At (216), the method 200 can include comparing the second defined residue manager tool depth range to the second detected residue manager tool position with a computing system. At (218), the method 200 can include altering a position of a residue manager tool of the second row unit when the second detected residue manager tool position of the second row unit varies from the second defined residue manager tool depth range with a second actuator operably coupled with the computing system. In some cases, altering the position of the ground-engaging tool of the second row unit when the second detected residue manager tool position of the second row unit varies from the second defined residue manager tool depth range can further include providing instructions from the computing system to a controller associated with the second row unit. In turn, the second controller can be configured to manipulate the second actuator.

In some instances, altering a position of a residue manager tool of the second row unit when the second detected residue manager tool position of the second row unit varies from the second defined residue manager tool depth range with a second actuator operably coupled with the computing system can further include activating the second actuator when the second detected residue manager tool position of the second row unit varies from the second defined residue manager tool depth range. When the second detected residue manager tool position returns to the second defined residue manager tool depth range, the second actuator may return to a deactivated state.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the position of the ground engaging tool and/or any other component of the residue manager assembly. In some instances, the vehicle learning engine may allow for changes to the position of the ground engaging tool and/or any other component of the residue manager assembly to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for a row unit of a planting implement, the system comprising:
   a frame;
   a residue manager assembly operably coupled with the frame, the residue manager assembly comprising:
      a ground-engaging tool;
      an actuator positioned within a housing and operably coupled with an adjustment rod, the adjustment rod configured to extend from a position within the housing to a position external of the housing to alter a position of the ground-engaging tool relative to the frame; and
      a sensor assembly positioned within the housing and configured to capture data indicative of a parameter of the ground-engaging tool; and
   a computing system communicatively coupled to the actuator and the sensor assembly, the computing system being configured to:
      receive the data indicative of the parameter of the ground-engaging tool;
      determine a detected position of the ground-engaging tool based on the parameter of the ground-engaging tool; and
      activate the actuator to alter the position of the ground-engaging tool relative to the frame based on a deviation of the detected position of the ground-engaging tool from a defined tool position range of the ground-engaging tool.

2. The system of claim 1, wherein the ground-engaging tool includes one or more fingers to break up crop residue on a soil surface.

3. The system of claim 1, further comprising:
   a user interface operably coupled with the computing system, wherein the defined tool position range of the ground-engaging tool is received through the user interface.

4. The system of claim 1, further comprising:
   a controller operably coupled with the actuator and the computing system, wherein the computing system activates the actuator by providing instructions to the controller and the controller manipulates the actuator based on the instructions provided by the computing system, and wherein the controller is physically separated from the computing system.

5. The system of claim 4, wherein the sensor assembly is further coupled with the controller.

6. The system of claim 5, wherein one or more subsequent modifications of the actuator is performed based on the data from the sensor assembly that is provided to the controller.

7. The system of claim 6, wherein the one or more subsequent modifications are performed without additional instructions from the computing system.

8. The system of claim 1, wherein the residue manager assembly further comprises:
   a linkage operably coupled with the adjustment rod, the linkage configured to regulate a contact force between the ground-engaging tool and a soil.

9. The system of claim 1, wherein the actuator is an electronically controlled motor.

10. A method for an agricultural operation, the method comprising:
    receiving a first defined residue manager tool depth range for a first row unit;
    receiving, from a first sensor assembly positioned within a first actuator housing, data indicative of a first detected residue manager tool position based on a load on a first actuator within the actuator housing;
    comparing, with a computing system, the first defined residue manager tool depth range to the first detected residue manager tool position; and
    altering, with the first actuator positioned within the first actuator housing and operably coupled with the computing system, a position of a residue manager tool of the first row unit when the first detected residue manager tool position of the first row unit varies from the first defined residue manager tool depth range.

11. The method of claim 10, further comprising:
    a second defined residue manager tool depth range for a second row unit;
    receiving, from a second sensor assembly, data indicative of a second detected residue manager tool position;
    comparing, with the computing system, the second defined residue manager tool depth range to the second detected residue manager tool position; and
    altering, with a second actuator operably coupled with the computing system, a position of the residue manager tool of the second row unit when the second detected residue manager tool position of the second row unit varies from the second defined residue manager tool depth range.

12. The method of claim 11, wherein the first defined residue manager tool depth range and the second defined residue manager tool depth range are received from a user interface operably coupled with the computing system.

13. The method of claim 11, wherein the first defined residue manager tool depth range and the second defined residue manager tool depth range are received from an electronic device operably coupled with the computing system.

14. The method of claim 11, wherein the first defined residue manager tool depth range and the second defined residue manager tool depth range are determined based on one or more look-up tables.

15. The method of claim 10, wherein altering the position of the residue manager tool of the first row unit when the first detected residue manager tool position of the first row unit varies from the first defined residue manager tool depth range with the first actuator operably coupled with the computing system further comprises:
   activating the first actuator when the first detected residue manager tool position of the first row unit varies from the first defined residue manager tool depth range; and
   returning the first actuator to a deactivated state when the first detected residue manager tool position returns to the first defined residue manager tool depth range.

16. A residue manager adjustment system for a planting implement, the system comprising:
   a ground-engaging tool positioned below a frame of a row unit;
   an actuator assembly including an electrically-controlled actuator operably coupled with an adjustment rod, the actuator configured to alter a position of the ground-engaging tool relative to the frame through actuation of the adjustment rod relative to a housing;
   a sensor assembly configured to capture data indicative of a position, a speed and/or an acceleration of the adjustment rod; and
   a computing system communicatively coupled to the actuator, the computing system being configured to:
      receive the data from the sensor assembly;
      determine a detected position of the ground-engaging tool from the data; and
      activate the actuator to alter the position of the ground-engaging tool relative to the frame based on a deviation of the detected position of the ground-engaging tool from a defined tool position range of the ground-engaging tool.

17. The system of claim 16, wherein the computing system is further configured to:
   deactivate the actuator when the detected position of the ground-engaging tool returns to the defined tool position range of the ground-engaging tool.

18. The system of claim 16, wherein the sensor assembly is positioned externally from an actuator housing, and wherein the sensor assembly is configured to detect a position between the sensor assembly and the ground-engaging tool.

19. The system of claim 16, further comprising:
   a soil sensor operably coupled with the computing system, wherein altering a position of the ground-engaging tool relative to the frame is at least based in part on data provided by the soil sensor.

* * * * *